2,916,528

PRODUCTION OF UNSATURATED CYCLO-ALIPHATIC COMPOUNDS

Jennings H. Jones and Merrell R. Fenske, State College, Pa., assignors to Esso Research and Engineering Company, a corporation of Delaware No Drawing. Application October 23, 1957
Serial No. 691,790

8 Claims. (Cl. 260—666)

This invention relates to the conversion of epoxides, such as those produced by hydrocarbon oxidation or other processes, to high yields of the hydrocarbon substituted cycloalkenes having more carbon atoms than the epoxides. The latter products are not only a valuable source of chemicals but the overall process offers a method for increasing the molecular weight range of a hydrocarbon feed. Such a process is useful when it is desired to convert certain readily abundant hydrocarbons or certain oxygenated compounds to more desirable and less available chemicals or hydrocarbon types. For example, it may be desired to convert low molecular weight hydrocarbons in the gasoline range to higher molecular weight hydrocarbons in the diesel, jet fuel, or fuel oil ranges. Further, it may be desired to convert saturated hydrocarbons to cyclic diolefins (either conjugated or non-conjugated) useful because of their special reactivity. In addition, it is often desired to convert open chain paraffinic hydrocarbons to unsaturated cycloaliphatics such as cycloalkenes and cycloalkadienes which in turn may be dehydrogenated to aromatics. These and other reactions may be accomplished by the process herein described. The products obtained with the present process are cycloaliphatic compounds, such as hydrocarbon-substituted cycloalkene and usually containing principally two double bonds per molecule. The polycyclic aliphatic compounds are composed of 2 or more such rings connected or fused together.

In carrying out the present invention the feed is preferably prepared by passing a paraffinic or naphthenic hydrocarbon, a naptha, fuel oil, or a kerosene, herein termed a paraffinic hydrocarbon feed, through an oxidation zone in which oxygen either as air, oxygen, ozone or an oxygen-containing gas) is injected with the hydrocarbon feed into an oxidation zone from which resulting products are then contacted with an acid type condensation catalyst to produce a product rich in unsaturated naphthenes. The latter product may be separated from the unreacted hydrocarbon simply by distillation because of the great difference in boiling point. The unreacted portion may, if desired, be returned for further treatment.

Although it is preferred to conduct the reaction following the two-step procedure outlined above, other alternate paths are possible. Thus, after carrying out the oxidation step, it would be possible to concentrate the epoxides (by means of distillation, extraction, or adsorption, for example) and then contact the epoxide concentrate with the acid condensation catalyst or agent. Another alternate path for preparing the unsaturated naphthenes could involve the use of epoxides synthesized by means other than that of hydrocarbon oxidation. For example, epoxides useful in the above process could be synthesized by the epoxidation of olefins, by the treatment of chlorohydrins with caustic, by the hydrogenation of epoxy alkadienes, or by the dehydration of glycols or in certain cases of dioxanes.

To prepare the epoxy containing feed, reference may be had to U.S. 2,725,344 in which the hydrocarbon (e.g. naphtha) feed is oxidized with from 0.3 to 2 moles of oxygen per mole of hydrocarbon, depending on the reaction conditions, the nature of the feed, and the degree of oxidation desired. Although it is generally preferred to use substantially pure oxygen, air or any inert gas such as steam containing oxygen may be used. If extensive conversion is desired, the oxidation should be carried out in several successive steps. The oxidation reaction is carried out at temperatures from about 275° C. to 480° C. The pressure range is from about 0 to 100 p.s.i.g. No catalyst is needed for oxidation of this type, and the contact time should be from 1 to 5 seconds, and preferably not more than 3 seconds. The nature of the epoxides produced depends on the molecular weight and the type of hydrocarbon treated. For example, n-hexane yields an aliphatic epoxide portion containing chiefly 2,5-epoxy n-hexane, 1,4-epoxy n-hexane, 2,4-epoxyhexane, and 2,3-epoxyhexane; cyclohexane also yields a mixture of aliphatic compounds such as 1,2-epoxycyclohexane and 1,4-epoxycyclohexane, while methylcyclohexane and methylcyclopentane yield epoxymethylcyclohexanes and epoxymethylcyclopentanes, respectively. The term "epoxyalkane" is employed herein to include epoxycycloalkanes as well as the open chain compounds. Reference may be made to the above-mentioned U.S. patent for a more detailed description of this non-catalytic oxidation step. It should be obvious to one skilled in the art that several conventional oxidation processes, both catalytic and non-catalytic in nature, may be employed to oxidize the hydrocarbon feed to the resulting epoxide or mixture thereof.

The single catalytic dehydration and condensation step of the process may be carried out by passing the vapors from the oxidation zone containing the aforesaid epoxy compounds through hot phosphoric acid preferably maintained at a temperature of about 150 to 200° C. Other acidic catalysts such as phosphoric acid on kieselguhr, p-toluene sulfonic acid, sulfuric acid, etc. also may be used in this step of the reaction although other conditions may be needed, e.g. temperatures of 25° C. or in the range of 0 to 200° C.

The overall conditions of the reaction are such that essentially no reaction would take place on passing the hydrocarbon feed through the apparatus in the absence of oxygen. Moreover, without the second step in the process, the major products would be oxygenated compounds rather than the unsaturated naphthenic hydrocarbons having a larger number of carbon atoms per molecule than the starting hydrocarbons.

The reaction taking place in the process described in this invention is essentially one in which the epoxides produced in the oxidation step of the process undergo dehydration and condensation to yield unsaturated naphthenic hydrocarbon molecules. The process is illustrated by means of the following equation wherein the 2,5-epoxy n-hexane was obtained by the oxidation of n-hexane. The compounds are saturated unless otherwise indicated. For convenience, all hydrogens have been omitted.

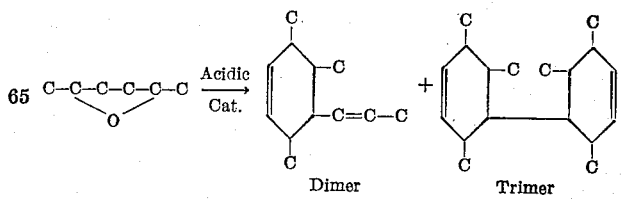

It is to be further understood that higher polymers of the above type are also formed and that trace to minor amounts of acyclic dienes are produced.

As a further example of the process, the following reaction is presented. In order to illustrate the process more fully by avoiding handling of complex mixtures, a single pure product isolated in the oxidation step of the reaction is used in the illustration. Although the following is a specific illustration of the present invention, it is not to be considered as a limitation thereof. It will be understood that variations, changes and modifications may be made in the process described without departing from the purpose or spirit of the invention.

*Example*

A quantity totaling 2000 grams of 90 percent phosphoric acid was placed in a three-liter flask fitted with a dropping bottle, a mechanical stirrer, a thermometer extending into the liquid, and a condenser arranged to collect distillate. A Dry Ice-acetone cooled trap and a wet gasometer were connected in series to a well-cooled receiver attached to the condenser. The phosphoric acid was heated to 150° C. and while stirring, 800 grams (8 moles) of 2,5-epoxy n-hexane (one of the major products produced by the vapor phase oxidation of n-hexane) was added gradually during a period of 6 hours. During the addition of the epoxide, 200 grams of a hydrocarbon layer (bromine number=71) and 71 grams of water distilled off. A water distillate layer was separated and the hydrocarbon portion was returned to the flask by gradually adding it during a period of 3 hours. During the latter addition, 80 grams of a hydrocarbon layer and 24 grams of water distilled off. The procedure of separating the water and recycling the hydrocarbon portion to the reaction flask was continued (an additional 3 times) until a total of 121 grams of water and only 31 grams of a hydrocarbon layer (bromine number=163) had distilled off. The entire process required 11 hours. No material collected in the cold trap and no gas was produced.

The major reaction product remained as a separate layer on top of the phosphoric acid which had acquired a greenish color. Upon separating the two layers, 580 grams (after washing and drying) of an unsaturated hydrocarbon layer and 2033 grams of a phosphoric acid layer were obtained.

The 580 grams of hydrocarbon layer represented a yield of 87 percent of the theoretical assuming only carbon and hydrogen to be present. It possessed the following boiling range and properties:

The acid solubility of the various fractions is also given above. These data indicate either the presence of saturated hydrocarbons (sulfuric acid-insoluble material) or that the acid polymerized the olefins and diolefins present. The fact that the refractive index decreased after acid extraction most probably indicates that some saturated hydrocarbons were originally present.

The various fractions from the above distillation were stored in a cold box maintained at −40° F. After several days at this temperature fractions 1 and 2 poured, fraction 3 barely poured, whereas fraction 4 and the residue did not pour, being too viscous to flow. No crystallization was noted.

The hydrocarbon layer product (31 grams) which distilled out of the reaction flask during the phosphoric acid treatment was found on fractionation through an efficient column to consist of a mixture of hexenes, hexadienes, and saturated hydrocarbons boiling over the range of 60 to 120° C.

The phosphoric acid layer although deeply colored was clean in that no sludge and no tarry materials were present; it was suitable for reuse in additional similar experiments. The acid layer (2033 grams) on dilution with water yielded 10 grams of unidentified oxygenated material.

The total water layer (117 grams) distilled out of the reaction mixture was found to contain 4 grams of oxygenated material—the remainder was water.

A summary of the various products produced in the above reaction together with the yield data is given below:

| Product | Grams | Percent Yield |
|---|---|---|
| Unsaturated hydrocarbon mixture | 587 | 87.4 |
| Hexene(s) | 14.6 | 2.2 |
| Hexadiene(s) | 2.6 | 0.4 |
| $C_6$ olefins and paraffins | 6.9 | 1.0 |
| Oxygenated material | 14.0 | 1.7 |
| Unaccounted for, handling and drying losses | | 7.3 |
| | | 100.0 |

An attempt was made to react a portion of the main unsaturated hydrocarbon product from the above reaction with maleic anhydride but essentially no reaction occurred. This indicated that the diolefinic hydrocarbons present were not conjugated. If conjugated diolefins were desired, isomerization of the non-conjugated forms to the conjugated types probably could be accomplished

[Charge: 29.2 grams to a Claisen flask fitted with a Snyder distilling head]

| Frac. | Grams | Weight percent of Charge | B.P. Range, ° C. | $N_D^{20}$ | Br. No. | Vol. percent Sol. in 95% $H_2SO_4$ | $N_D^{20}$ of acid Insol. |
|---|---|---|---|---|---|---|---|
| 1 | 8.3 | 28.4 | 65°/90 to 102°/28 mm | 1.4569 | 179 | 55 | 1.4507 |
| 2 | 3.9 | 13.4 | 102°/28 to 131°/25 mm | 1.4710 | 146 | 59 | 1.4605 |
| 3 | 2.7 | 9.2 | 131°/28 to 125°/5 mm | 1.4952 | 98 | 72 | 1.4757 |
| 4 | 11.3 | 38.7 | 125° to 169°/5 mm | 1.5106 | 78 | 83 | 1.4904 |
| Residue | 3.0 | 10.3 | Above 169°/5 mm | | | | |

NOTE.—Calculated Br. No. for $C_{12}H_{24}$ olefin=95; for $C_{18}H_{36}$ olefin=63.5; for $C_{12}H_{22}$ diolefin =193; for $C_{18}H_{36}$ diolefin=128.

According to the boiling range data, fractions 1 and 4 above contained a preponderance of $C_{12}$ and $C_{18}$ hydrocarbons, respectively. Fractions 2 and 3 probably were composed of a mixture of $C_{12}$ and $C_{18}$ hydrocarbons, while the residue contained higher products, e.g. $C_{24}+$.

On the basis of the bromine numbers of the various fractions the $C_{12}$ portion (fraction 1) contained about 14 percent as olefins and 86 percent as diolefins, whereas the $C_{18}$ portion (fraction 4) contained about 78 percent as olefins and 22 percent as diolefins. The bromine number data on such complex fractions are merely an indication of the nature of the material with respect to the number of double bonds per molecule.

by passing the mixture through a zone filled with alumina for example.

In order to characterize further the main unsaturated hydrocarbon product produced as above, a quantity totaling 450 grams was hydrogenated using 15 percent of its weight of Raney nickel at a temperature of 200° C. during a period of 30 hours. On the basis of the amount of hydrogen absorbed, the unsaturated hydrocarbon mixture had an average of 2 double bonds per molecule.

On distilling a portion of the hydrogenated product, it was found that a complex mixture of saturated hydrocarbons in the $C_{12}$ to $C_{18}$ range predominated. On the basis of aniline point and refractive index data the main products were indicated to be cyclohexane and dicyclic naphthene derivatives. Paraffin and aromatic hydrocarbons were shown to be absent.

Other epoxides such as 2,5-epoxy n-heptane and 2,4-epoxyheptane (from the oxidation of n-heptane), and 2,5-epoxy n-nonane (from the oxidation of n-nonane) behaved as above and gave dimeric and trimeric unsaturated hydrocarbons as the predominant products. In general, the epoxy aliphatic hydrocarbons, either cyclic or acylic, will preferably have 5 to 16 carbons per molecule.

2,3-epoxypentane when treated with hot phosphoric acid as above gave a mixture of unsaturated hydrocarbons containing a predominant proportion of 20 to 25 carbon atoms per molecule.

1,2-epoxycyclohexane, epoxymethylcyclohexanes, and epoxymethylcyclopentanes (from the oxidation of cyclohexane, methylcyclohexane, and methylcyclopentane, respectively) behave in a similar manner to yield complex unsaturated hydrocarbon mixtures.

When 2,5-epoxy n-hexane was treated with concentrated sulfuric acid at 25° C. for a period of 24 hours, an unsaturated hydrocarbon layer product similar to that obtained in the first example cited above was obtained. Just as above, hydrocarbons in the $C_{12}$ and $C_{18}$ range were predominant.

2,4-epoxyheptane when carefully mixed with concentrated sulfuric acid and allowed to stand at room temperature for a period of 24 hours gave a mixture of $C_{14}$, $C_{21}$, and some higher molecular weight unsaturated hydrocarbons as the major products.

2,5-epoxynonane when mixed with concentrated sulfuric acid in the proportion of 1 to 3.5 by weight and allowed to stand at room temperature for a period of 20 hours gave a mixture of $C_{18}$ and higher unsaturated naphthenic hydrocarbons as the major products.

The use of either 60 percent aqueous sulfuric acid or pure p-toluene sulfonic acid at a temperature 100° C. to 140° C. also was successful in converting $C_6$ epoxides to the complex unsaturated hydrocarbon mixtures. Thus, 2,5-epoxy n-hexane when refluxed for a period of 16 hours with 60 percent sulfuric acid gave nearly a quantitative yield of the usual $C_{12}$ and $C_{18}$ unsaturated hydrocarbon mixture.

The amount of acidic catalyst employed may vary considerably depending on the temperatures employed, molecular weight and type of epoxide feed. There, of course, should be sufficient catalyst present to effect the conversion of a substantial amount of the epoxides present in the feed.

Having described the present invention, what is sought to be protected is pointed out in the appended claims.

What is claimed is:

1. A process for preparing an unsaturated cycloaliphatic compound which comprises contacting an epoxy aliphatic compound with an acidic catalyst selected from the group consisting of phosphoric acid, phosphoric acid on kieselguhr, para-toluene sulfonic acid and sulfuric acid at temperatures of about 0–200° C. whereby an unsaturated cycloaliphatic compound having more carbon atoms than said epoxide is formed.

2. A process for preparing a cycloalkene from an epoxy aliphatic compound which comprises contacting said epoxy compound with an acidic catalyst selected from the group consisting of phosphoric acid, phosphoric acid on kieselguhr, para-toluene sulfonic acid and sulfuric acid at temperatures of about 0–200° C. under conditions of condensation and dehydration to form a cycloalkene having at least twice the number of carbon atoms as said starting epoxy compound.

3. A process according to claim 2 wherein the epoxy feed is contacted in vapor phase with phosphoric acid catalyst.

4. A process for preparing hydrocarbon substituted cycloalkene having at least $2n$ carbon atoms from a saturated epoxyalkane having $n$ carbon atoms which comprises contacting a feed containing said epoxyalkane with an acidic catalyst selected from the group consisting of phosphoric acid, phosphoric acid on kieselguhr, para-toluene sulfonic acid and sulfuric acid at temperatures of about 0–200° C. for a period of time sufficient to cause dehydration and condensation of the epoxyalkane and recovering a hydrocarbon phase containing said hydrocarbon substituted cycloalkene.

5. A process for the preparation of cycloalkenes from epoxy aliphatic compounds containing from 3 to 16 carbon atoms per molecule which comprises passing said epoxy aliphatic compounds into a reaction zone, contacting said epoxy aliphatic compounds with an acidic catalyst selected from the group consisting of phosphoric acid, phosphoric acid in kieselguhr, para-toluene sulfonic acid and sulfuric acid at temperatures of about 0–200° C. for a time sufficient to convert a substantial portion of said epoxy aliphatic compounds to hydrocarbons having at least one cycloalkene ring structure.

6. A process for converting an epoxyalkane into a hydrocarbon having at least one cyclohexene ring and having more carbon atoms than said epoxyalkane which comprises reacting said epoxyalkane containing at least 6 carbon atoms in contact with an acidic catalyst selected from the group consisting of phosphoric acid, phosphoric acid on kieselguhr, para-toluene sulfonic acid and sulfuric acid at temperatures of 0–200° C. for a time euifficient to dehydrate and condense said epoxyalkane, separating the reaction product into aqueous and hydrocarbon phases and recovering a hydrocarbon phase containing a hydrocarbon compound having at least one cyclohexene ring and having more carbon atoms per molecule than said epoxy compound.

7. A process according to claim 6 wherein the epoxy feed is contacted in the vapor phase with phosphoric acid catalyst.

8. A process in accordance with claim 7 wherein said epoxyalkane is 2,5-epoxy n-hexane and wherein said cyclohexene containing product contains at least 12 carbon atoms.

References Cited in the file of this patent

UNITED STATES PATENTS

| | | |
|---|---|---|
| 2,492,956 | Ballard et al. | Jan. 3, 1950 |
| 2,599,089 | Castle et al. | June 3, 1952 |
| 2,678,338 | Linn | May 11, 1954 |
| 2,692,292 | Robinson | Oct. 19, 1954 |
| 2,768,979 | Hambrock et al. | Oct. 30, 1956 |
| 2,781,407 | Schmerling | Feb. 12, 1957 |
| 2,802,023 | Fenske et al. | Aug. 6, 1957 |
| 2,836,631 | Viola et al. | May 27, 1958 |

OTHER REFERENCES

Olberg et al.: Jour. Am. Chem. Soc., vol. 66, pp. 1096–1099 (1944).